(12) United States Patent
Moher

(10) Patent No.: US 7,773,701 B2
(45) Date of Patent: *Aug. 10, 2010

(54) SYSTEMS AND METHODS FOR RAPID SIGNAL DETECTION AND IDENTIFICATION

(76) Inventor: Michael L. Moher, P.O. Box 501, Stittsville, ON (CA) K2S 1A6

( * ) Notice: Subject to any disclaimer, the term of this patent is extended or adjusted under 35 U.S.C. 154(b) by 0 days.

This patent is subject to a terminal disclaimer.

(21) Appl. No.: 12/026,512

(22) Filed: Feb. 5, 2008

(65) Prior Publication Data

US 2008/0123763 A1 May 29, 2008

Related U.S. Application Data

(63) Continuation of application No. 10/883,170, filed on Jul. 1, 2004, now Pat. No. 7,346,116.

(51) Int. Cl.
*H03D 1/00* (2006.01)
(52) U.S. Cl. .................. 375/343; 375/142; 375/150; 708/422
(58) Field of Classification Search ............ 375/142, 375/150, 343; 708/5, 422, 813
See application file for complete search history.

(56) References Cited

U.S. PATENT DOCUMENTS

| | | | | |
|---|---|---|---|---|
| 3,631,339 A * | 12/1971 | Low et al. ............... 324/76.33 |
| 3,732,410 A * | 5/1973 | Mackechnie ............... 708/322 |
| 4,025,853 A * | 5/1977 | Addeo .................... 455/422.1 |
| 4,732,355 A * | 3/1988 | Parker .................... 246/34 R |
| 4,783,640 A * | 11/1988 | Reynolds et al. ........... 333/156 |
| 5,029,481 A * | 7/1991 | Keech .................... 73/861.06 |
| 5,282,227 A * | 1/1994 | Crawford .................. 375/327 |
| 5,359,627 A * | 10/1994 | Resnikoff ................. 375/254 |
| 5,504,781 A * | 4/1996 | Wolf ...................... 375/242 |
| 5,881,057 A * | 3/1999 | Komatsu .................. 370/335 |
| 6,154,486 A | 11/2000 | Scott et al. |
| 6,237,013 B1 | 5/2001 | Usui |
| 6,307,622 B1 | 10/2001 | Lewis |
| 6,333,974 B1 * | 12/2001 | Liang et al. .............. 379/93.35 |
| 6,411,664 B1 | 6/2002 | Usui et al. |
| 6,771,976 B1 * | 8/2004 | Koyama .................. 455/502 |
| 6,888,566 B2 * | 5/2005 | Larkin et al. ............. 348/208.4 |
| 6,947,476 B2 * | 9/2005 | Song ...................... 375/149 |
| 7,088,782 B2 | 8/2006 | Mody et al. |
| 7,149,266 B1 * | 12/2006 | Imamura et al. ............ 375/355 |
| 7,224,714 B1 * | 5/2007 | Barman et al. ............. 375/140 |
| 7,271,596 B2 * | 9/2007 | Furse et al. ............... 324/533 |
| 7,317,749 B2 * | 1/2008 | Song ...................... 375/142 |
| 7,336,738 B2 * | 2/2008 | Wakamatsu ................ 375/343 |
| 2002/0054408 A1 | 5/2002 | Lee |
| 2002/0172268 A1 | 11/2002 | Sato |
| 2003/0086489 A1 | 5/2003 | Hernandez et al. |
| 2004/0076246 A1 | 4/2004 | Vanderperren et al. |
| 2004/0190560 A1 | 9/2004 | Maltsev et al. |
| 2005/0078773 A1 | 4/2005 | Astrachan |
| 2005/0220175 A1 | 10/2005 | Zhou |
| 2005/0261895 A1 | 11/2005 | Bauer et al. |
| 2005/0265219 A1 | 12/2005 | Murphy et al. |
| 2006/0146962 A1 | 7/2006 | Troya et al. |
| 2006/0209936 A1 | 9/2006 | Eerola et al. |

* cited by examiner

*Primary Examiner*—Jean B Corrielus
(74) *Attorney, Agent, or Firm*—Stolowitz Ford Cowger LLP

(57) ABSTRACT

The present invention comprises systems, methods, and devices for detecting the presence of a specified signal type by autocorrelating the signal with a time-delayed copy of itself, by simultaneously crosscorrelating the signal with an expected signal type, and by then comparing the results of the autocorrelation and crosscorrelation to determine whether or not the signal is present and to ascertain its type.

21 Claims, 4 Drawing Sheets

SYSTEMS AND METHODS FOR RAPID SIGNAL DETECTION AND IDENTIFICATION

CROSS REFERENCE TO RELATED APPLICATIONS

This is a continuation of U.S. application Ser. No. 10/883,170, filed Jul. 1, 2004, now U.S. Pat. No. 7,346,116, the entire disclosure of which we incorporated by reference.

FIELD OF THE INVENTION

The present invention relates generally to signal detection, and more specifically to detecting the presence or absence of a signal and rapidly ascertaining its type.

BACKGROUND OF THE INVENTION

As IEEE Std. 802.11 wireless local area network (WLAN) capabilities grow in popularity and become the standard for a wide array of consumer electronic products, designers must deal with efficiency problems inherent in the present state of the art. As such, much attention must be paid to preamble detection techniques when building IEEE Std. 802.11 enabled architectures.

In commonly used preamble detection techniques, a correlator is often utilized to distinguish between a known signal and noise. The output of the correlator is typically compared to a predetermined threshold and a signal is declared present if the threshold is exceeded. However, if the signal is variable, then the threshold must be dynamically adjusted. This approach is typically difficult and often ineffective. When there is amplitude uncertainty in the received signal, a common approach is to hardlimit the signal before correlation to remove amplitude variations. The correlator is also frequently hardlimited to match the signal.

However in multipath environments, the signal is typically altered as it is reflected and absorbed in a variable fashion by fixed and moving barriers. This reduces the crosscorrelation between the actual signal received and the ideal transmitted signal and, as a result, the probability of missed detection increases significantly. Furthermore, in multipath environments, the false alarm rate also increases significantly. In addition, as transmission frequencies increase and identification periods decrease, existing technologies will have an increasingly difficult time recognizing and identifying signals in the allotted time.

SUMMARY OF THE INVENTION

Thus, a need exists for an improved signal detection and identification system that is capable of rapidly detecting a signal and identifying its type in multiple signal and multipath environments. In satisfaction of this need, embodiments of the present invention comprise systems, methods and devices for detecting the presence of a signal and ascertaining its type by autocorrelating the signal with a time-delayed copy of itself, by simultaneously crosscorrelating or matching the same signal with at least one expected signal type, and by comparing the results of the autocorrelation and crosscorrelation both to determine whether the signal is present and also to ascertain the signal type.

In accordance with one aspect of the invention, a method is provided for detecting the presence of a specified signal type. This method preferably comprises the steps of receiving a signal, autocorrelating the signal with a time-delayed copy of itself to form an autocorrelation result, simultaneously crosscorrelating the signal with an expected signal type to form a crosscorrelation result, and comparing the autocorrelation result and the crosscorrelation result in order to determine whether the original signal was of the specified signal type.

In accordance with another aspect of the invention, a method is provided for detecting the presence of a specified signal type. This method preferably comprises the steps of receiving a signal, autocorrelating the signal with a time-delayed copy of itself at a first time to form a first autocorrelation result, and autocorrelating the signal with a time-delayed copy of itself at a second time to form a second autocorrelation result. Preferably, the method also comprises crosscorrelating the signal with a Barker signal type at the first time to form a first crosscorrelation result and crosscorrelating the signal with an OFDM signal type at the second time to form a second crosscorrelation result. Finally, the method may also comprise a step of declaring a signal detected if the summation of (1) the maximum of the first autocorrelation result and the second autocorrelation result and (2) the maximum of the first crosscorrelation result and the second crosscorrelation result exceed a specified value.

In accordance with a third aspect of the invention, a system is provided for detecting the presence of a specified signal type. This system preferably comprises a receiver configured to receive an input signal, a buffer in communication with the receiver, an autocorrelator configured to receive the signal from both the receiver and the buffer, and a crosscorrelator configured to receive the signal from the buffer in parallel with the autocorrelator. Preferably, the system also includes an evaluator configured to receive signal information from both the autocorrelator and the crosscorrelator. Furthermore, the evaluator of this system is preferably configured to determine, based on the signal information it receives from the autocorrelator and the crosscorrelator, whether the input signal comprises a specified signal type.

In accordance with yet another aspect of the invention, a device is provided for detecting the presence of a specified signal type. The device preferably comprises a signal input line, a delay line having an input terminal, a first output terminal, and a second output terminal, wherein the input terminal is in electrical communication with the signal input line. Furthermore, the device also preferably includes an autocorrelator having a first input terminal, a second input terminal, and an output terminal, wherein the first input terminal is in electrical communication with the signal input line, and wherein the second input terminal is in electrical communication with the delay line first output terminal. Additionally, the device comprises a crosscorrelator having a first input terminal, a second input terminal, and an output terminal, wherein the second input terminal is in electrical communication with the delay line second output terminal. The device also comprises an evaluator having a first input terminal, a second input terminal, and an output terminal, wherein the first input terminal is in electrical communication with the autocorrelator output terminal, and wherein the second input terminal is in electrical communication with the crosscorrelator output terminal.

BRIEF DESCRIPTION OF DRAWINGS

These and other aspects of this invention will be readily apparent from the detailed description below and the appended drawings, which are meant to illustrate and not to limit the invention, and in which.

In the drawings, like reference numbers generally refer to corresponding parts throughout the different views.

DETAILED DESCRIPTION OF THE INVENTION

Generally, embodiments of the present invention detect the presence or absence of an incoming signal and assess whether or not the signal is of an expected type by autocorrelating the incoming signal with a time delayed copy of itself and by crosscorrelating the signal with the expected signal type. The autocorrelation and crosscorrelation operations preferably take place in parallel to each other. The results of the autocorrelation and crosscorrelation may then be compared to determine the signal presence and type.

Figure 1:
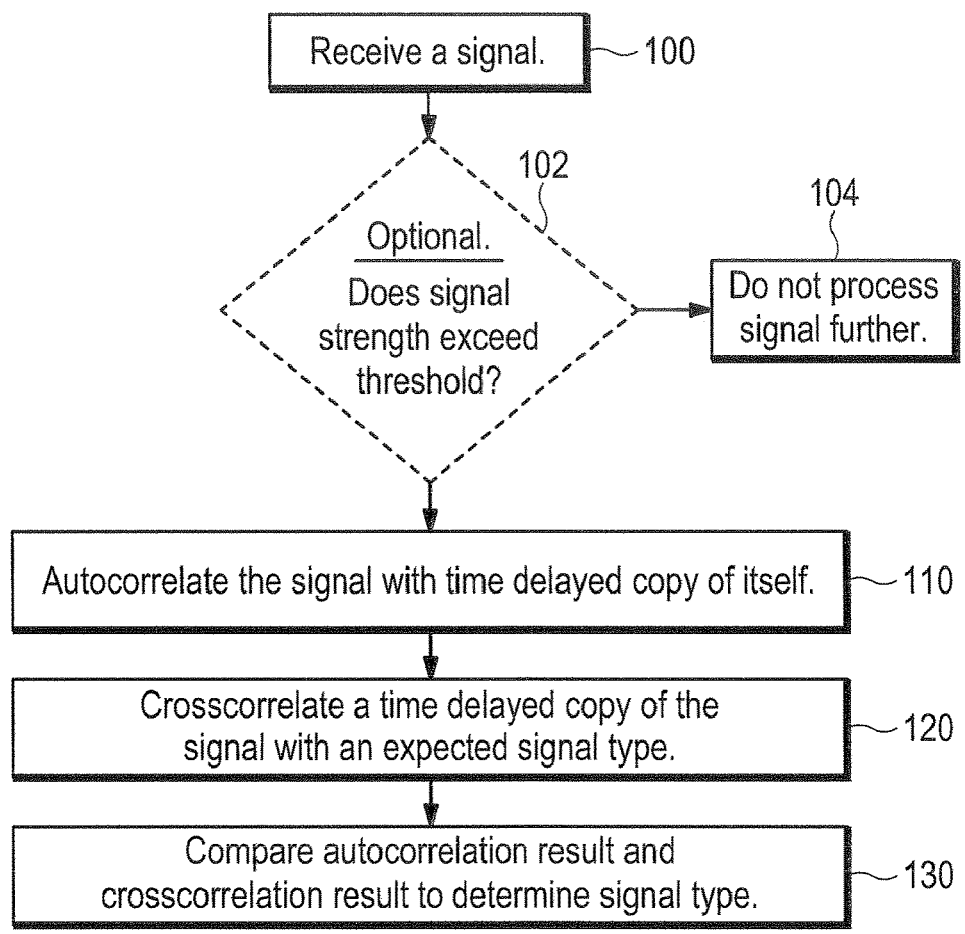
FIG. 1 is a flow diagram illustrating a method in accordance with an embodiment of the present invention.

FIG. 1 is a flow diagram illustrating a method in accordance with an embodiment of the present invention. In this embodiment, a signal is received in Step 100. The strength of the received signal is evaluated to ensure that it exceeds a predetermined threshold value before the signal is further processed (Step 102). In these optional embodiments, if the signal strength is insufficient the signal is not processed further. The received signal may also be hardlimited prior to further processing. Next, the signal is autocorrelated with a time delayed copy of itself to form an autocorrelation result (Step 110). In the preferred embodiment, the autocorrelation (Step 110) comprises summing over at least two symbol periods an absolute value of a result obtained by multiplying the signal with a time delayed copy of itself. This autocorrelation (Step 110) is preferably performed by a standard autocorrelator, known generally to those skilled in the art. The autocorrelation (Step 110) is more robust when the analog saturation is minimized.

Simultaneously, in a process preferably performed in parallel to the autocorrelation process, the signal is crosscorrelated with one or more expected signal types to form one or more crosscorrelation results (Step 120). In the preferred embodiment, the crosscorrelation (Step 120) comprises comparing the signal to a Barker sequence or a SHORT sequence using a matched filter. The SHORT and Barker sequences are known in the art as being related to the IEEE 802.11a and 802.11b standards, respectively. In alternate embodiments, the crosscorrelation (Step 120) may also comprise summing over at least two symbol periods an absolute value of a result obtained by convolving the signal with a SHORT sequence. In some embodiments, the SHORT sequence is hardlimited. Preferably, the crosscorrelation (Step 120) is performed by a standard crosscorrelator, known generally to those skilled in the art.

Preferably, the SHORT sequence is cyclically extended so that it is the same length as the Barker sequence. This lengthening makes comparison easier and improves performance. In addition, although the crosscorrelations are preferably summed over two symbol periods, they may be summed over increasing numbers of periods. For example, in signals described by the IEEE Std. 802.11a specification, a maxima is determined every 64 samples at a sampling rate of 80 MHz. In signals described by the IEEE Std. 802.11b specification, a maxima is determined every 80 samples at a sampling rate of 80 MHz. Accordingly, to differentiate between these two signal types in a 2.4 GHz operation, it is preferable to wait for the longer of the two, or about 3 periods of 80 samples, or 3 microseconds, before a decision is made.

Finally, the autocorrelation and crosscorrelation results are compared in order to determine whether a signal is detected, and if so, what type of signal it is (Step 130). This comparison may be performed using a variety of algorithms. In some embodiments, the comparison algorithm comprises determining whether the autocorrelation result is greater than or less than the crosscorrelation result. In the preferred embodiment, the comparison algorithm comprises a mathematical comparison where a signal is declared detected (Step 250), if:

$((A \times \text{Autocorrelation\_result}) + (B \times \text{Crosscorrelation\_result}) > C)$

OR $((D \times \text{Crosscorrelation\_result}) > E)$

AND $(F \times \text{Autocorrelation\_result} + G \times \text{Crosscorrelation\_result} > H))$ In the preferred embodiment, the values of the constants comprise: A=1, B=1.54, C=102, D=1, E=40, F=1.33, G=1, H=80. An alternative comparison comprises multiplying the absolute value square of the autocorrelation result by a first factor, multiplying the absolute value square of the crosscorrelation result by a second factor, and then determining whether the summation of these two products exceeds a specified value. If the summation does exceed the specified value, then a signal has been detected. Preferably, the first factor is 1, the second factor is 2.6, and the specified value is 5000.

One skilled in the art will readily recognize that with multiple autocorrelators and crosscorrelators, as set forth below, multiple signal types can be detected and identified by the claimed invention. In many embodiments of the present invention, the autocorrelation and the crosscorrelation results are calculated using complex arithmetic, while the comparison is performed using the absolute value (i.e. positive real numbers) of the autocorrelation and crosscorrelation results.

Although SHORT and Barker sequences are used in the exemplary embodiments, the methods employed by the claimed invention may be used to differentiate between any plurality of expected signal types. These expected signal types may include, for example, any Direct Sequence Spread Spectrum (DSSS) or Orthogonal Frequency Division Multiplexed (OFDM) signal. In addition, in many embodiments, the expected signal type is selected from those described by the specifications for IEEE Std. 802.11. In some embodiments, the signal type may be selected from those described by the specifications of at least one of IEEE Std. 802.11a, 802.11b, or 802.11g. In summary, methods in accordance with the present invention may be used to detect and identify any known periodic sequence with a near zero mean.

Figure 2:
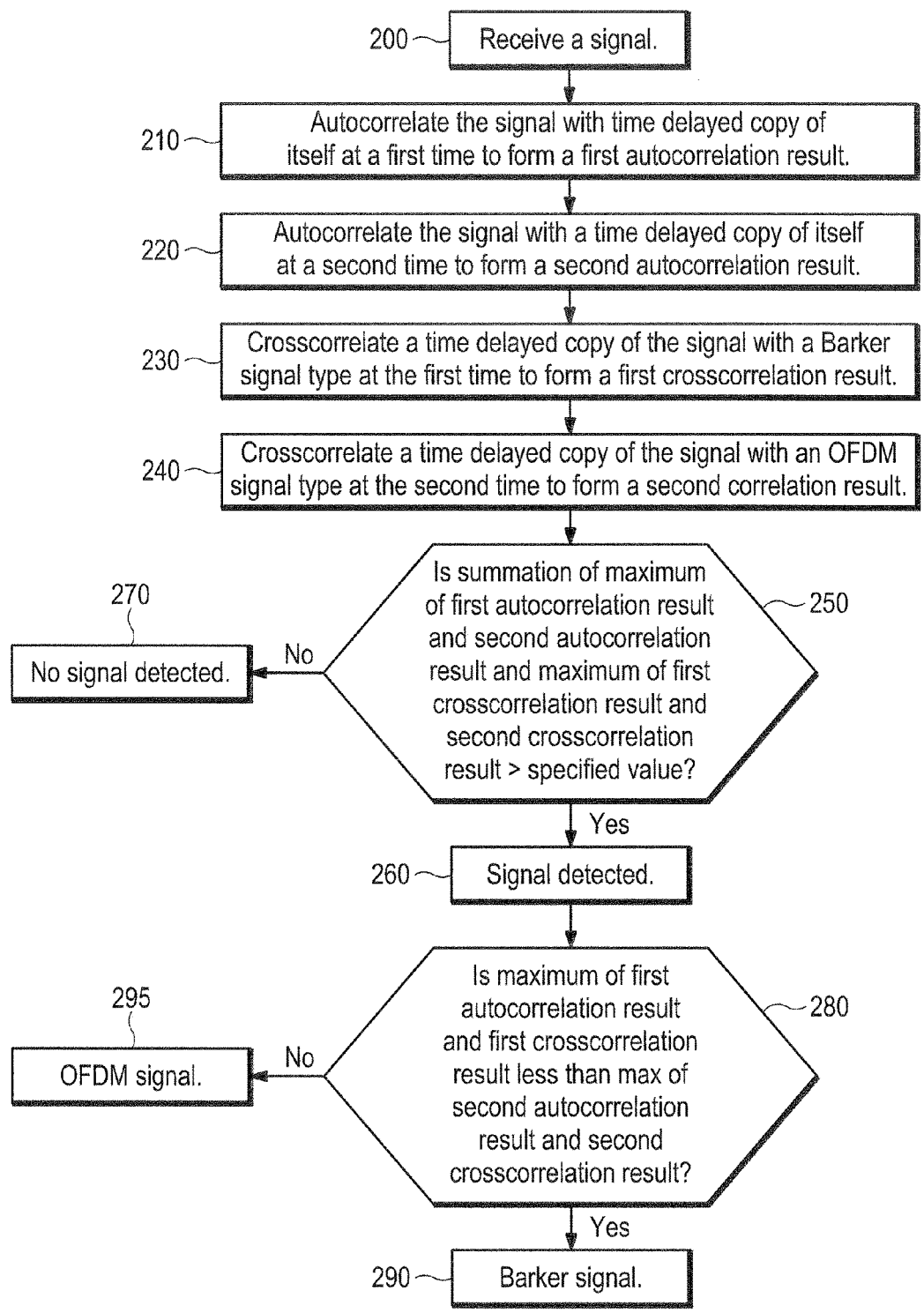
FIG. 2 presents a flow diagram illustrating a method in accordance with another embodiment of the present invention.

FIG. 2 presents a flow diagram illustrating a method in accordance with another embodiment of the present invention. In this embodiment, as illustrated in Step 200, a signal is received. As described previously, in alternate embodiments the strength of the received signal may be evaluated to ensure that it is beyond a predetermined threshold value before the signal is further processed. If the signal strength is not greater than the threshold value, in these optional embodiments, the signal may be discarded. The received signal is preferably also hardlimited prior to further processing.

Next, the signal may be autocorrelated with a time-delayed copy of itself at a first time to form a first autocorrelation result (Step 210). In this embodiment, the signal is also autocorrelated with a time-delayed copy of itself at a second time to form a second autocorrelation result (Step 220). These autocorrelation steps are more robust when analog saturation is minimized. In the preferred embodiment autocorrelation comprises summing over at least two symbol periods an absolute value of a result obtained by multiplying the signal with a time delayed copy of itself. However, as described previously, any traditional method of autocorrelation may be employed in alternate embodiments.

Simultaneously to the autocorrelation processes described above, the signal is preferably also crosscorrelated with a Barker signal type at the first time to form a first crosscorrelation result (Step 230). In this embodiment, the signal is preferably also crosscorrelated with an OFDM signal type at the second time to form a second crosscorrelation result (Step 240). As set forth above, any traditional means of crosscorrelation may be employed. In addition, one skilled in the art will recognize that this technique may be used to differentiate a wide variety of signals merely by crosscorrelating against an appropriate signal type at the proper time.

In this embodiment, the first time comprises the moment when the signal reaches the $64^{th}$ tap of a delay line configured to time-delay the signal. In addition, the second time preferably comprises the moment when the signal reaches the $80^{th}$ tap of a delay line configured to time-delay the signal.

Finally, in this embodiment, the first and second autocorrelation results, and the first and second crosscorrelation results are preferably compared using a predetermined algorithm (Step 250).

For 5.2 GHz operation, the comparison algorithm in this embodiment comprises, a mathematical logic operation where a signal is preferably declared detected (Step 250), if:

$$((A \times First\_Autocorrelation\_result) + (B \times First\_Crosscorrelation\_result) > C)$$

OR $$((D \times First\_Crosscorrelation\_result > E)$$

AND $$(F \times First\_Autocorrelation\_result + G \times First\_Crosscorrelation\_result > H))$$

Preferably, the values of the variable factors in this algorithm comprise: A=1, B=1.54, C=102, D=1, E=40, F=1.33, G=1, H=80, An alternative comparison algorithm for 5.2 GHz operation comprises multiplying the absolute value square of the first autocorrelation result by a first factor, multiplying the absolute value square of the first crosscorrelation result by a second factor, and then determining whether the summation of these two products exceeds a specified value. If the summation does exceed the specified value, then the signal is declared detected (Step 260). Preferably, the first factor is 1, the second factor is 2.6, and the specified value is 5000.

For 2.4 GHz operation the comparison algorithm in this embodiment comprises summing the maximum of the first and second autocorrelation results with the maximum of the first and second crosscorrelation results, and determining whether the summation exceeds a specified value. An example of such a specified value may be 80. If the summation exceeds this specified value then a signal is declared detected (Step 260). If the summation is less than or equal to this value, then a signal is not declared detected (Step 270). In some embodiments, the maximum of the first autocorrelation result and the second autocorrelation result may be further scaled by a factor of one-half (½) prior to summation.

An alternate comparison algorithm for 2.4 GHz operation comprises declaring a signal detected if the sum of one-half the maximum of the squared absolute value of the first autocorrelation result and the squared absolute value of the second autocorrelation result with the maximum of the squared absolute value of the first crosscorrelation result and the squared absolute value of the second crosscorrelation result exceeds a specified value. In the preferred embodiment, the specified value is 2000.

In the case that a signal has been detected at Step 260 for 2.4 GHz operation, many embodiments of the present invention may comprise the additional step of comparing the first and second autocorrelation results, and the first and second crosscorrelation results using a specified algorithm (Step 280). An example of such an algorithm is an operation where if the maximum of the first autocorrelation result and the first crosscorrelation result are less than the maximum of the second autocorrelation result and the second crosscorrelation result, then the signal is identified as a Barker signal (Step 290). Otherwise the signal is identified as an OFDM signal (Step 295). Another example of such an algorithm is an operation where if the maximum of the absolute value square of the first autocorrelation result and the absolute value square of the first crosscorrelation result are less than the maximum of the absolute value square of the second autocorrelation result and the absolute value square of the second crosscorrelation result, then the signal is identified as a Barker signal (Step 290). Otherwise the signal is identified as an OFDM signal (Step 295).

Figure 3:
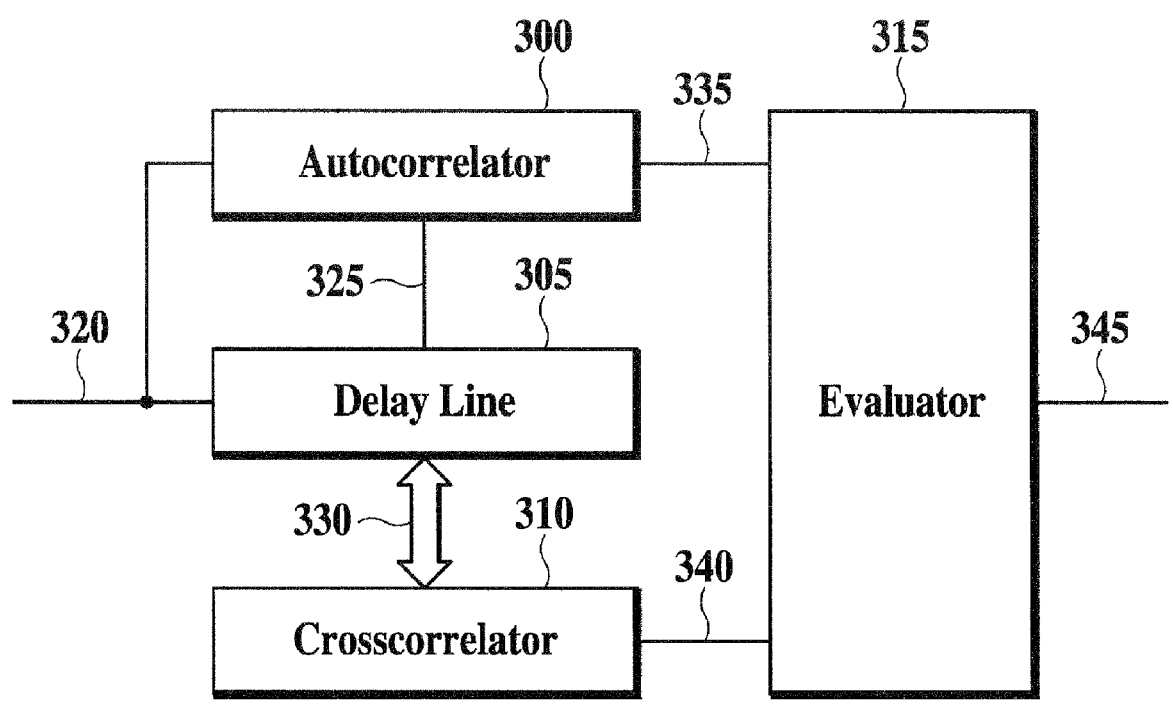
FIG. 3 presents a conceptual block diagram of an embodiment of the present invention.

FIG. 3 presents a conceptual block diagram of an embodiment of the present invention. As illustrated in FIG. 3, this embodiment preferably comprises an autocorrelator 300, a delay line 305, a crosscorrelator 310, and an evaluator 315.

Preferably, the delay line 305 comprises at least one input and at least two outputs. In this embodiment, line 320 is used for data input into the delay line 305. The delay line 305 may output data via line 325 and bus 330. In the preferred embodiment, bus 330 comprises a plurality of lines connecting the delay line 305 and the crosscorrelator 310. The autocorrelator 300 preferably comprises at least two inputs and at least one output. In this embodiment, the autocorrelator receives input via line 320. The autocorrelator may also receive input from the delay line 305 via line 325. Additionally, the autocorrelator may transmit output data to the evaluator 315 via line 335. The crosscorrelator 310 preferably comprises at least one input and at least one output. The crosscorrelator 310 may receive input from the delay line 305 via bus 330. The crosscorrelator may also output data via line 340 to the evaluator 315. Finally, the evaluator 315 preferably comprises at least two inputs and at least one output. In this embodiment, the evaluator 315 receives input via lines 335 and 340. The evaluator may in turn output data via line 345.

One skilled in the art will readily appreciate that the autocorrelator 300 may comprise any device capable of autocorrelating a signal, preferably with a time delayed copy of itself. Similarly, one skilled in the art will also appreciate that the crosscorrelator 310 may comprise any device capable of crosscorrelating two signals. The evaluator 315 preferably comprises any device capable of performing mathematical functions on two or more signals in order to produce an output result signal. Finally, one skilled in the art will readily appreciate that the delay line 305 may comprise a shift register with a plurality of taps or a similar instrumentality.

In the operation of this embodiment, the autocorrelator 300 and the delay line 305, both receive a signal via line 320. The autocorrelator 300 preferably autocorrelates the signal with a time-delayed copy of itself, received via line 325 from the delay line 305, to form an autocorrelation result. In many embodiments, autocorrelating the signal comprises summing over at least two symbol periods an absolute value of a result obtained by multiplying the signal with a time-delayed copy of itself. The autocorrelation is more robust when analog saturation is minimized. In a simultaneous process, the crosscorrelator receives a copy of the signal from the delay line 305 via bus 330, and crosscorrelates this signal with an expected signal type to form a crosscorrelation result. In some embodiments, crosscorrelating the signal may comprise summing over at least two symbol periods an absolute value of a result obtained by convolving the signal with a SHORT sequence. In many embodiments, crosscorrelating the signal comprises comparing the signal to a Barker sequence using a matched filter. As set forth previously, a variety of crosscorrelators and signal types may be employed.

In this embodiment, the evaluator 315 may receive the autocorrelation and crosscorrelation results via lines 335 and 340, respectively. After receiving these results, the evaluator 315 then preferably compares the autocorrelation result and the crosscorrelation result using a comparison algorithm to determine whether the signal is of a specified type. In this embodiment, the comparison algorithm comprises determining whether the autocorrelation result is greater than or less than the crosscorrelation result. Alternatively, the comparison algorithm may comprise one or more of the comparison algorithms set forth above.

Figure 4:
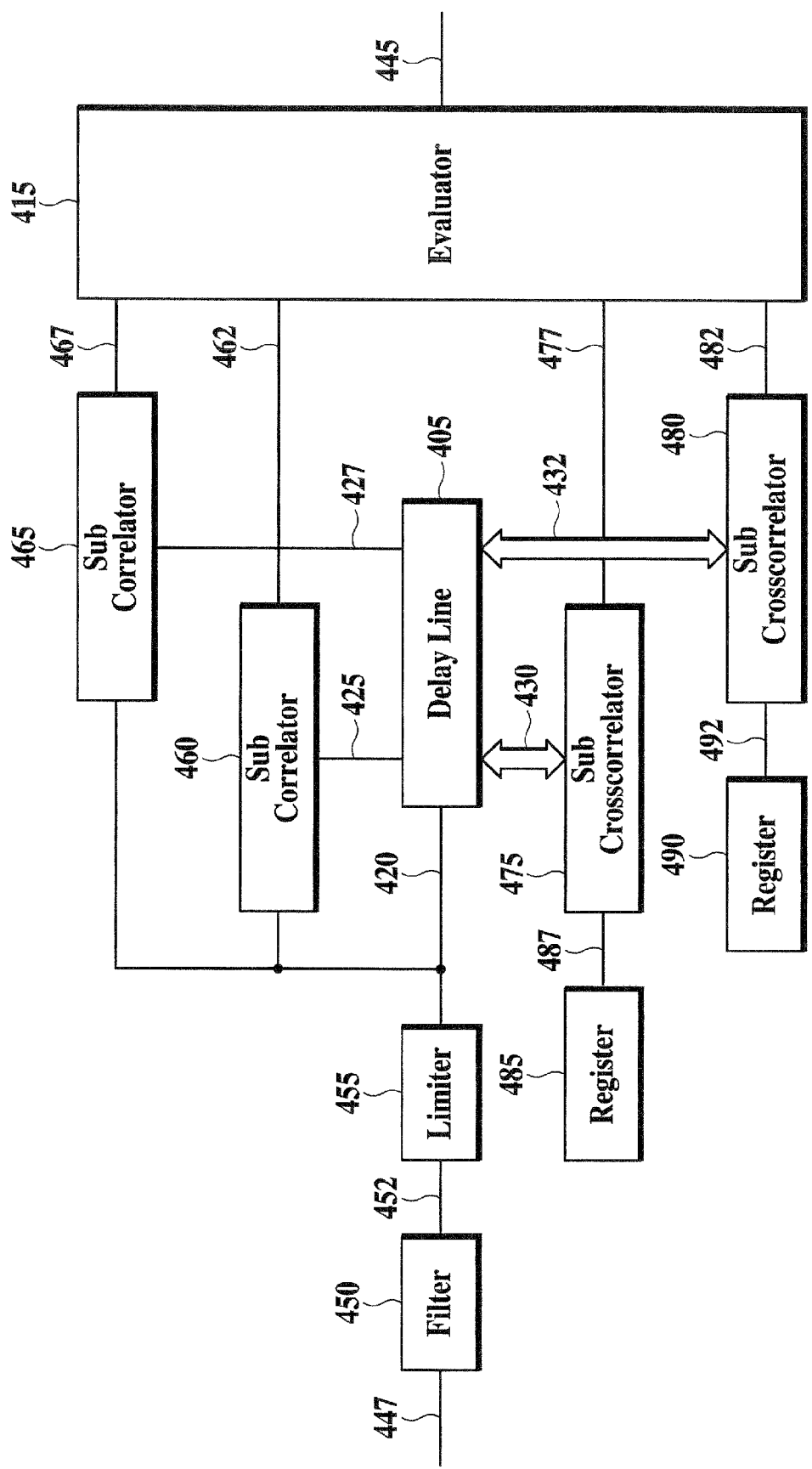
FIG. 4 is a conceptual block diagram of another embodiment of the present invention.

FIG. 4 is a conceptual block diagram of another embodiment of the present invention. As shown in FIG. 4, this embodiment preferably comprises a delay line 405, an evaluator 415, a signal strength filter 450, a hardlimiter 455, a first sub-autocorrelator 460, a second sub-autocorrelator 465, a first sub-crosscorrelator 475, a second sub-crosscorrelator 480, a first sequence register 485, and a second sequence register 490.

The strength filter 450 preferably comprises at least one input and at least one output. Line 447 is used for data input into the strength filter 450 and line 452 is used for data output from the strength filter 450. Line 452 also preferably connects the strength filter 450 to the hardlimiter 455. The hardlimiter 455 is in turn preferably connected to the delay line 405 and also to the first sub-autocorrelator 460 and to the second sub-autocorrelator 465 via line 420.

Preferably, the first sub-autocorrelator 460 is connected to an nth tap of the delay line 405 via line 425. The first sub-autocorrelator is preferably connected by line 467 to the evaluator 415. Similarly, the second sub-autocorrelator 465 is preferably connected to an mth tap of the delay line 405 via line 427. The second sub-autocorrelator 465 is also preferably connected to the evaluator 415 via line 462. In the preferred embodiment, the value of n is 64 and the value of m is 80.

Additionally, the delay line 405 may be connected via bus 430 to the first sub-crosscorrelator 475. In the preferred embodiment, bus 430 comprises a plurality of lines connecting the delay line 405 to the first sub-crosscorrelator 475. The first sub-crosscorrelator 475 is in turn preferably connected to the first sequence register 485 via line 487, and may also be connected to the evaluator 415 via line 477. The delay line 405 is also preferably connected to the second sub-crosscorrelator 480 via bus 432. In the preferred embodiment, bus 432 comprises a plurality of lines connecting the delay line 405 to the second sub-crosscorrelator 480. The second sub-crosscorrelator 480 may in turn be connected to the second sequence register 490 via line 492, and may also be connected to the evaluator 415 via line 482.

Preferably, the evaluator 415 comprises at least four inputs and at least one output. In this embodiment, the evaluator 415 receives input via lines 462, 467, 477, and 482, and outputs data via line 445.

In this embodiment, the signal strength filter 450 preferably comprises any device that allows a signal to pass through it when the signal meets a particular threshold strength level. This threshold strength level may be predetermined or varied over time. In this embodiment, the hardlimiter 455 comprises a device which normalizes an incoming signal.

One skilled in the art will also readily appreciate that both the first sub-autocorrelator 460 and the second sub-autocorrelator 465 may individually comprise any device capable of autocorrelating a signal, preferably with a time delayed copy of itself. Similarly, both the first sub-crosscorrelator 475 and the second sub-crosscorrelator 480 may individually comprise any device capable of crosscorrelating, or matching, two signals. The evaluator 415 preferably comprises any device capable of performing mathematical functions on two or more signals in order to produce an output result signal. Finally, the delay line 405 preferably comprises a standard shift register with a plurality of taps or a similar instrumentality.

In operation of this embodiment, a signal is received from line 447 by the signal strength filter 450. The strength filter 450 then preferably determines if the signal strength is above a specified threshold level. If it is, the signal strength filter 450 preferably transmits the signal via line 452. However, if the signal strength is below the threshold level, the strength filter 450 may not transmit the signal.

Next, the hardlimiter 455 receives the signal via line 452. The hardlimiter 455 preferably normalizes the received signal using a normalization algorithm. The hardlimiter 455 then preferably transmits the normalized signal to at least one of the delay line 405, the first sub-autocorrelator 460, and the second sub-autocorrelator 465.

In this embodiment, the first sub-autocorrelator 460 preferably autocorrelates the incoming signal received from the hardlimiter via line 420 with an incoming signal received from the nth tap of the delay line 405 via line 425. The incoming signal received via line 425 is preferably the time delayed version of the signal received from the hardlimiter via line 420. The first sub-autocorrelator 460 preferably sums this autocorrelation value over at least one symbol period and then takes the absolute value of the result. In some embodiments, the first sub-autocorrelator 460 may calculate the absolute value squared of the result. These absolute values or squared absolute values may then be summed by the first sub-autocorrelator 460 over two consecutive symbol periods. The resultant signal is then preferably transmitted to the evaluator 415 via line 462.

Similarly, the second sub-autocorrelator 465 preferably autocorrelates the incoming signal received from the hardlimiter via line 420 with an incoming signal received from the mth tap of the delay line 405 via line 427. The incoming signal received via line 427 is preferably the time delayed version of the signal received from the hardlimiter via line 420. The second sub-autocorrelator 465 preferably sums this autocorrelation value over at least one symbol period and then takes the absolute value of the result. In some embodiments, the second sub-autocorrelator 465 may calculate the absolute value squared of the result. These absolute values or squared absolute values may then be summed by the second sub-autocorrelator 465 over two consecutive symbol periods. The resultant signal is then preferably transmitted to the evaluator 415 via line 467. In various embodiments, the autocorrelation performed by the first sub-autocorrelator 460 and the second sub-autocorrelator 465 is more robust when analog saturation is minimized.

In this embodiment, the cross-correlation process takes place in parallel to the auto-correlation process described above. The first sub-crosscorrelator 475 preferably receives a signal sequence from the delay line 405 via bus 430. The first sub-crosscorrelator 475 may then perform a continuous correlation of the signal sequence from the delay line 405 with a first signal sequence received from the first sequence register 485. Preferably at the same time, the second sub-crosscorrelator 480 may receive a signal sequence from the delay line 405 via bus 432. The second sub-crosscorrelator 480 may then perform a continuous correlation of the signal sequence from the delay line 405 with a signal sequence received from the second sequence register 490.

Preferably, the maximum absolute value crosscorrelation for the first sub-crosscorrelator 475 is determined by the first sub-crosscorrelator 475. This maximum may then be summed over at least two, or more preferably, three symbol periods. The result of this summation is then preferably transmitted to the evaluator 415 via line 477. Similarly, the maximum absolute value crosscorrelation for the second sub-crosscorrelator 480 is determined. The maximum may then be summed over at least two, or more preferably, three symbol periods and the result may then be transmitted to the evaluator 415 via line 482.

The sequences stored in the first sequence register 485 and the second sequence register 490 may comprise the Barker sequence and the SHORT sequence respectively. However, one skilled in the art will readily appreciate that these sequences may be varied and need not be limited to the Barker and SHORT sequences.

In this embodiment, the evaluator 415 has at least four inputs and at least one output. The evaluator 415 may receive a first autocorrelation result via line 462, a second autocorrelation result via line 467, a first crosscorrelation result via line 477, and a second crosscorrelation result via line 482. The evaluator 415 may then perform one or more mathematical functions on the input signals received to determine a result, which is in turn output along line 445. For example, in the preferred embodiment the evaluator 415 determines if the summation of the maximum of the first autocorrelation result and the second autocorrelation result and the maximum of the first crosscorrelation result and the second crosscorrelation result exceed a specified threshold value. If this summation is greater than the specified threshold, then a signal packet has been detected. In the preferred embodiment, the evaluator 415 may then proceed to determine the type of signal packet that was detected via a mathematical operation on the results from the first and second sub-autocorrelator 460 and 465, and from the first and second sub-crosscorrelator 475 and 480. An example of such a mathematical operation is that if the maximum of the first autocorrelation result and the first crosscorrelation result are less than the maximum of the second autocorrelation result and the second crosscorrelation result, then the signal is identified as a Barker signal; otherwise it is identified as an OFDM signal. Alternatively, the evaluator 415 may detect and identify the signal by performing mathematical functions on the received input based on the algorithms set forth above in the description of FIG. 2.

Advantageously, the claimed invention meets the needs set forth previously by rapidly detecting and identifying a signal. The present invention also advances over the prior art by working reliably in environments containing adjacent channel interference for operation at 5.2 GHz and by reliably distinguishing between IEEE Std. 802.11b and IEEE Std. 802.11g packets at 2.4 GHz. Furthermore, in the preferred embodiment, the present invention is insensitive to direct current offset. It is additionally implemented with relatively low complexity.

It should be appreciated by those skilled in the art, that various omissions, additions and modifications may be made to the methods and systems described above without departing from the spirit of the invention. All such modifications and changes are intended to fall within the scope of the invention as illustrated by the appended claims.

I claim:

1. A method comprising:
   using a device to autocorrelate a signal with a time-delayed copy of the signal stored in a buffer at first and second times thereby generating first and second autocorrelated signals, respectively;
   using the device to crosscorrelate the time-delayed copy of the signal stored in the buffer with first and second signals at the first and second times thereby generating first and second crosscorrelated signals, respectively; and
   using the device to detect the signal responsive to at least one of the first and second autocorrelated signals and at least one of the first and second crosscorrelated signals.

2. The method of claim 1, where using the device to crosscorrelate the time-delayed copy of the signal with the first and second signals includes using the device to crosscorrelate the time-delayed copy of the signal with at least one of a Barker signal or an OFDM signal or combinations thereof.

3. The method of claim 1, further comprising:
   using the device to determine an autocorrelated maximum of the first and second autocorrelated signals; and
   using the device to determine a crosscorrelated maximum of the first and second crosscorrelated signals;
   where the using the device to detect the signal operates responsive to determining that a sum of the autocorrelated maximum and the crosscorrelated maximum exceeds a predetermined value.

4. The method of claim 3, further comprising using the device to scale the autocorrelated maximum by half prior to summing the autocorrelated maximum and the crosscorrelated maximum.

5. The method of claim 1, where the first time comprises a time when the signal reaches a predetermined tap of a delay line.

6. The method of claim 1, where the second time comprises a time when the signal reaches a predetermined tap of a delay line.

7. The method of claim 1, further comprising:
   using the device to identify the signal as a Barker signal responsive to determining that a maximum of the first autocorrelated signal and the first crosscorrelated signal is less than a maximum of the second autocorrelated signal and the second crosscorrelated signal, otherwise identifying the signal as an OFDM signal.

8. An apparatus, comprising:
   means for autocorrelating a signal with a first and second time-delayed copies of the signal at first and second times thereby generating first and second autocorrelated signals, respectively;
   means for crosscorrelating third and fourth time-delayed copy of the signal with first and second signals at the first and second times thereby generating first and second crosscorrelated signals, respectively; and
   means for detecting the signal responsive to at least one of the first or second autocorrelated signals and the first or second crosscorrelated signals.

9. The apparatus of claim 8, where the means for crosscorrelating the third and fourth time-delayed copies of the signal with the first and second signals includes means for crosscorrelating the third and fourth time-delayed copies of the signal with at least one of a Barker signal or an OFDM signal or a combinations thereof.

10. The apparatus of claim 8, where the means for detecting the signal is configured to:
   determine an autocorrelated maximum of the first and second autocorrelated signals; and
   determine a crosscorrelated maximum of the first and second crosscorrelated signals;
   where the means for detecting the signal operates responsive to a sum of the autocorrelated maximum and the crosscorrelated maximum exceeding a predetermined value.

11. The apparatus of claim 10, where the means for detecting the signal is configured to scale the autocorrelated maximum by half prior to summing the autocorrelated maximum and the crosscorrelated maximum.

12. The apparatus of claim 8, where the first time comprises a time when the signal reaches a predetermined tap of a delay line.

13. The apparatus of claim 8, where the second time comprises a time when the signal reaches a predetermined tap of a delay line.

14. The apparatus of claim 8, where the means for detecting the signal is configured to identify the signal as a Barker signal responsive to a maximum of the first autocorrelated signal and the first crosscorrelated signal being less than a maximum of the second autocorrelated signal and the second crosscorrelated signal, otherwise to identify the signal as an OFDM signal.

15. An apparatus, comprising:
   means for buffering an input signal;
   means for autocorrelating the input signal with the buffered input signal at first and second times to thereby generate first and second autocorrelated signals, respectively;
   means for crosscorrelating the buffered input signal at the first and second time to thereby generate first and second crosscorrelated signals, respectively; and
   means for identifying a signal type corresponding to the input signal responsive to the at least one of first and second autocorrelated signals and at least one of the first and second crosscorrelated signals.

16. The apparatus of claim 15, where the means for crosscorrelating is configured to sum, over at least two periods, an absolute value of a comparison of the buffered input signal with a Barker sequence.

17. The apparatus of claim 15, where the means for crosscorrelating is configured to sum, over at least two periods, an absolute value of convolving the buffered input signal with a SHORT sequence.

18. The apparatus of claim 17, where the SHORT sequence comprises a hardlimited SHORT sequence.

19. The apparatus of claim 15, where the means for autocorrelating is configured to sum, over at least two periods, an absolute value of multiplying the input signal with a time-delayed copy of itself.

20. The apparatus of claim 15, further comprising means for hardlimiting the input signal.

21. The apparatus of claim 15, where the signal type comprises at least one signal described by IEEE Standard 802.11a, 802.11b or 802.11g.

* * * * *

UNITED STATES PATENT AND TRADEMARK OFFICE
CERTIFICATE OF CORRECTION

PATENT NO. : 7,773,701 B2  Page 1 of 1
APPLICATION NO. : 12/026512
DATED : August 10, 2010
INVENTOR(S) : Moher It is certified that error appears in the above-identified patent and that said Letters Patent is hereby corrected as shown below:

Column 1, line 9, delete "incorporated" and insert -- incorporate --.

Signed and Sealed this
Tenth Day of April, 2012

David J. Kappos
*Director of the United States Patent and Trademark Office*